US011312236B1

(12) United States Patent
Kim

(10) Patent No.: US 11,312,236 B1
(45) Date of Patent: Apr. 26, 2022

(54) FOLDABLE PEDAL APPARATUS FOR VEHICLE

(71) Applicants: HYUNDAI MOTOR COMPANY, Seoul (KR); KIA CORPORATION, Seoul (KR)

(72) Inventor: Eun Sik Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/376,695

(22) Filed: Jul. 15, 2021

(30) Foreign Application Priority Data

Mar. 8, 2021 (KR) .......................... 10-2021-0030370

(51) Int. Cl.
*G05G 1/30* (2008.04)
*B60K 26/02* (2006.01)
*B60T 7/06* (2006.01)
*B60T 7/04* (2006.01)

(52) U.S. Cl.
CPC ............. *B60K 26/02* (2013.01); *B60T 7/042* (2013.01); *B60T 7/06* (2013.01)

(58) Field of Classification Search
CPC . B60R 21/09; G05G 1/30; G05G 1/32; G05G 1/36; G05G 1/38; G05G 1/40; G05G 1/44; G05G 1/445; G05G 5/005; G05G 5/03; G05G 5/05; G05G 5/28; B60K 26/02; B60K 26/021; B60K 2026/026; B60K 2026/024; B60T 7/04; B60T 7/06; B60T 7/065
See application file for complete search history.

(56) References Cited

U.S. PATENT DOCUMENTS 2,281,117 A * 4/1942 Sladky ..................... G05G 1/30
74/513
6,182,525 B1 * 2/2001 Bowers .................. B60K 20/02
180/274
6,318,208 B1 * 11/2001 Thongs, Jr. .............. G05G 1/38
74/513

(Continued)

FOREIGN PATENT DOCUMENTS

DE 102017215904 A1 * 3/2019 ............. B60N 3/063
DE 102018219487 A1 * 5/2020 ............... B60T 7/06
KR 10-2017-0137427    12/2017

*Primary Examiner* — Richard W Ridley
*Assistant Examiner* — Brian J McGovern
(74) *Attorney, Agent, or Firm* — Lempia Summerfield Katz LLC

(57) ABSTRACT

A foldable pedal apparatus for a vehicle includes: a pedal housing rotatably coupled to a footrest panel disposed below a driver seat, configured to come in contact with a front inclined surface of the footrest panel when rotating forward, and configured to come in contact with a bottom surface of the footrest panel when rotating rearward; a brake pedal pad rotatably coupled to the pedal housing and configured to be rotated by a driver; and an accelerator pedal pad rotatably coupled to the pedal housing and configured to be rotated by the driver, wherein when the pedal housing is in contact with the front inclined surface of the footrest panel by rotating forward, the brake pedal pad and the accelerator pedal pad are folded to be positioned between the front inclined surface and the pedal housing and are kept in a hidden state.

18 Claims, 14 Drawing Sheets

(56) References Cited

U.S. PATENT DOCUMENTS

| | | | | |
|---|---|---|---|---|
| 6,364,047 B1* | 4/2002 | Bortolon | ............... | B60K 23/02 |
| | | | | 180/334 |
| 8,770,616 B1* | 7/2014 | Draper | ................... | B60N 3/066 |
| | | | | 280/728.1 |
| 10,503,199 B1* | 12/2019 | Cone | ...................... | A61B 34/70 |
| 10,889,226 B1* | 1/2021 | Dean | ....................... | G05G 5/28 |
| 10,906,514 B1* | 2/2021 | Kim | ......................... | B60T 7/06 |
| 10,946,741 B1* | 3/2021 | Kim | ......................... | B60T 7/06 |
| 10,994,611 B1* | 5/2021 | Kim | ........................ | G05G 5/28 |
| 11,021,058 B1* | 6/2021 | Kim | .................... | B60K 26/021 |
| 2003/0094070 A1* | 5/2003 | O'Neill | .................. | G05G 1/405 |
| | | | | 74/560 |
| 2007/0137397 A1* | 6/2007 | Choi | ....................... | G05G 1/36 |
| | | | | 74/512 |
| 2009/0223319 A1* | 9/2009 | Choi | ..................... | G05G 1/405 |
| | | | | 74/512 |
| 2011/0132134 A1* | 6/2011 | Kim | ....................... | F02D 11/02 |
| | | | | 74/514 |
| 2014/0316648 A1* | 10/2014 | Min | .................... | B60K 26/021 |
| | | | | 701/36 |
| 2015/0107402 A1* | 4/2015 | Leem | ...................... | G05G 1/40 |
| | | | | 74/512 |
| 2015/0322835 A1* | 11/2015 | Ham | ...................... | F01N 11/00 |
| | | | | 701/29.2 |
| 2017/0225570 A1* | 8/2017 | El Aile | .................. | B62D 1/183 |
| 2020/0257329 A1* | 8/2020 | Kihara | .................... | B60K 26/02 |
| 2020/0317167 A1* | 10/2020 | Ghaffari | ................... | B60T 7/06 |
| 2021/0004040 A1* | 1/2021 | Dohmen | .................. | G05G 5/05 |
| 2021/0170988 A1* | 6/2021 | Villalva Sanchez | .... | B60R 21/09 |
| 2021/0318710 A1* | 10/2021 | Miletto | ................. | G05G 1/405 |
| 2021/0331584 A1* | 10/2021 | Kim | ........................ | G05G 1/40 |

* cited by examiner

FOLDABLE PEDAL APPARATUS FOR VEHICLE

CROSS REFERENCE TO RELATED APPLICATION

This application claims priority to and the benefit of Korean Patent Application No. 10-2021-0030370, filed on Mar. 8, 2021, the entire contents of which are incorporated herein by reference.

FIELD

The present disclosure relates to a foldable pedal apparatus for a vehicle.

BACKGROUND

The statements in this section merely provide background information related to the present disclosure and may not constitute prior art.

An autonomous vehicle, which is a smart vehicle employing an autonomous technology for going to a destination by itself even though a driver does not operate the steering wheel, acceleration pedal, brake, etc., is recently being rapidly developed.

If self-driving is generally used, a driver can select a manual driving mode in which the driver manually drives and a self-driving mode in which a vehicle goes by itself to a destination without the driver manually driving.

A driver should be able to take a rest in a comfortable position with his or her legs stretched in the self-driving mode. However, if pedals (the accelerator pedal and the brake pedal) disposed below the driver seat remain exposed in the interior, they interfere with the driver taking a rest.

Further, a driver does not operate the pedals (the accelerator pedal and the brake pedal) in the vehicle in the self-driving situation, but if the driver operates a pedal during self-driving, the vehicle control unit determines that the driver wants to stop self-driving and manually drive, thereby stopping control for self-driving.

However, since the pedals are installed to be exposed below the driver seat in a vehicle, there is a possibility that a driver unconsciously operates the pedals in the self-driving situation (mis-operation of a pedal), and in this case, there is a possibility of an accident depending on the road situation, the inter-vehicle distance, or the like.

Therefore, it is desired to develop a pedal apparatus that exposes a pedal pad toward a driver such that a driver can operate the pedal pad in the manual driving mode in which the driver manually drives, and that hides the pedal pad such that the driver cannot operate the pedal pad for a comfortable rest of the driver and safety such as anti-mis-operation in the self-driving situation.

The description provided above as a related art of the present disclosure is just for helping understanding the background of the present disclosure and should not be construed as being included in the related art known by those skilled in the art.

SUMMARY

The present disclosure provides a foldable pedal apparatus for a vehicle in which pedal pads protrude from a pedal housing to be exposed to a driver (pop-up state) such that the pedal pads can be operated by a driver in a manual driving mode in which the driver manually drives, and the pedal pads are inserted into the pedal housing not to be exposed to the driver (hidden state) such that the pedal pads cannot be operated by the driver in a self-driving situation, thereby enabling the driver to comfortably take a rest in the self-driving situation and improving safety by inhibiting mis-operation of the pedals in the self-driving situation.

The present disclosure provides a foldable pedal apparatus for a vehicle in which the popup amount of pedal pads (rearward movement distance of pedal pads) can be increased when the pedal pads enter a pop-up state from a hidden state, thereby enabling a driver to more easily and conveniently operate the pedal pads when the self-driving mode has been changed into the manual driving mode.

The present disclosure provides a foldable pedal apparatus for a vehicle in which the popup amount of pedal pads can be increased without using a rail structure, whereby a separate installation space of a rail is not desired and it is possible to inhibit malfunction due to foreign substances stuck in the rail.

In one form of the present disclosure, a foldable pedal apparatus for a vehicle includes: a pedal housing rotatably coupled to a footrest panel disposed below a driver seat, and configured to come in contact with a front inclined surface of the footrest panel when rotating forward, and to come in contact with a bottom surface of the footrest panel when rotating rearward; and a brake pedal pad and an accelerator pedal pad rotatably coupled to the pedal housing and being rotated by a driver, in which when the pedal housing is in contact with the front inclined surface of the footrest panel by rotating forward, the brake pedal pad and the accelerator pedal pad are folded to be positioned between the front inclined surface and the pedal housing and are kept in a hidden state not to be exposed toward the driver.

When the pedal housing is in contact with the bottom surface of the footrest panel by rotating rearward, the brake pedal pad and the accelerator pedal pad may be unfolded at a predetermined angle with respect to the pedal housing and may be kept in a pop-up state to be exposed to the driver.

A first end of the pedal housing may be rotatably coupled to the footrest panel by connection pins at a joint between the bottom surface and the front inclined surface of the footrest panel.

A hinge pin may be coupled to a second end of the pedal housing and may be disposed through the brake pedal pad and the accelerator pedal pad, whereby the brake pedal pad and the accelerator pedal pad may be individually rotated on the hinge pin.

The foldable pedal apparatus may include: a rotary motor fixed to the footrest panel and including a motor gear; a rotary cam module including a cam gear engaged with the motor gear; a pedal housing gear disposed at the pedal housing and engaged with the motor gear; a first spring module including a first end rotatably coupled to the brake pedal pad; and a second spring module including a first end rotatably coupled to the accelerator pedal pad; a first straight motion block including a first end rotatably coupled to a second end of the first spring module; and a second straight motion block including a first end rotatably coupled to a second end of the second spring module, in which the rotary cam module and the first and second straight motion block may be connected to each other by coming in contact with each other or may be disconnected from each other by separating from each other, depending on rotation of the rotary cam module.

The foldable pedal apparatus may further include a protective cover fixed to the footrest panel and configured to cover and protect the rotary motor and the rotary cam module.

The rotary cam module may include: a cam shaft integrally formed with a cam gear through the center of the cam gear; a first cam block eccentrically coupled to a first end of the cam shaft; and a second cam block eccentrically coupled to a second end of the cam shaft, in which arc grooves may be formed at first ends of the first and second cam blocks and may come in contact with the first and second straight motion blocks when the rotary cam module is rotated.

The spring modules each may include a cylinder, a rod, and a spring having both ends supported by the cylinder and the rod; the lengths of the spring modules may be changed by the rods moving through the cylinders, and the spring modules may be provided as two pieces having the same configuration and may be connected to the brake pedal pad and the accelerator pedal pad, respectively.

Second ends of the first and second straight motion blocks may be arc protrusions having a shape corresponding to the arc grooves of the cam block, and the arc grooves and the arc protrusions may come in contact with each other by rotation of the rotary cam module.

The foldable pedal apparatus may further include a guide pale coupled to the protective cover and configured to support the first and second straight motion blocks and to guide the straight motion blocks moving straightly.

When the pedal housing is in contact with the front inclined surface of the footrest panel by rotating forward, the pedal housing may include upper and lower openings and be configured to be open up and down with respect to the footrest panel so that foreign substance entering the pedal housing can be discharged through the upper and lower openings.

When the pedal housing is in contact with the front inclined surface of the footrest panel by rotating forward and the brake pedal pad and the accelerator pedal pad have been folded to be positioned between the front inclined surface and the pedal housing and not to be exposed to a driver in the hidden state, the brake pedal pad and the accelerator pedal pad may be open downward with respect to the pedal housing so that foreign substances entering the brake pedal pad and the accelerator pedal pad can be discharged through the lower openings.

When the pedal housing being in contact with the bottom surface of the footrest panel is rotated forward, a top of the brake pedal pad and a top of the accelerator pedal pad may come in contact with the front inclined surface of the footrest panel; and when the top of the brake pedal pad and the top of the accelerator pedal pad come in contact with the front inclined surface of the footrest panel, an angle between the pedal housing and the brake pedal pad and an angle between the pedal housing and an accelerator pedal may be the same angles as acute angles.

When the pedal housing that is in contact with the bottom surface of the footrest panel is rotated forward, a top of the brake pedal pad and a top of the accelerator pedal pad may come in contact with the front inclined surface of the footrest panel; and the top of the brake pedal pad and the top of the accelerator pedal pad may be both rounded so that the brake pedal pad and the accelerator pedal pad can be folded into the pedal housing when the top of the brake pedal pad and the top of the accelerator pedal pad come in contact with the front inclined surface of the footrest panel.

When the pedal housing is in contact with the bottom surface of the footrest panel by rotating rearward and the brake pedal pad and the accelerator pedal pad have been folded in a pop-up state to be exposed to a driver, a lower end of the brake pedal pad and a lower end of the accelerator pedal pad may be both in contact with a protrusion protruding upward at a rear end of the pedal housing and initial positions in pop-up state may be fixed.

The foldable pedal apparatus may further include: a first permanent magnet coupled to a hinge portion of the brake pedal pad; a second permanent magnet coupled to a hinge portion of the accelerator pedal pad; and PCBs fixed to the pedal housing and facing the first and second permanent magnets, in which the PCBs may detect a rotation angle of the brake pedal pad or the accelerator pedal pad and may generate a signal related to a pedal function on the basis of a magnetic flux change of the first and second permanent magnets when the brake pedal pad or the accelerator pedal pad is rotated.

When the pedal housing is rotated by operation of the rotary motor and positions of the permanent magnets are changed while the brake pedal pad and the accelerator pedal pad are rotated into the hidden state or a pop-up state, the PCBs may not generate a signal related to the pedal function to prevent mis-operation.

The PCBs may generate a signal related to the pedal function only when the positions of the permanent magnets are changed due to rotation of the brake pedal pad or the accelerator pedal pad by a driver, with the brake pedal pad and the accelerator pedal pad in a pop-up state and the rotary motor not in operation.

According to the foldable pedal apparatus of the present disclosure, the brake pedal pad and the accelerator pedal pad protrude from the pedal housing to enter the pop-up state to be exposed to a driver such that the brake pedal pad and the accelerator pedal pad can be operated by the driver in the manual driving mode in which the driver manually drives. Further, the brake pedal pad and the accelerator pedal pad are inserted into the pedal housing to enter the hidden state not to be exposed to the driver in the self-driving mode in which the driver does not manually drive. Accordingly, there is an effect that the driver can comfortably take a rest in the self-driving situation and safety can be improved by inhibiting mis-operation of the pedals in the self-driving situation.

Further, according to the foldable pedal apparatus of the present disclosure, since the brake pedal pad and the accelerator pedal pad are completely covered and hidden by the pedal housing in the hidden state, there is an effect that an excellent design can be provided, and particularly, even if a driver hits the pedal housing by stretching a foot by mistake, damage to the brake pedal pad and the accelerator pedal pad can be inhibited.

Further, when the foldable pedal apparatus according to the present disclosure changes into the pop-up state from the hidden state, the popup amount of the brake pedal pad and the accelerator pedal pad can be increased by the distance that the pedal housing rotates rearward on the connection pins. Accordingly, there is an effect that a driver can more easily and conveniently operate the brake pedal pad and the accelerator pedal pad when changing into a manual driving mode from a self-driving mode.

Further, according to the foldable pedal apparatus of the present disclosure, since the popup amount of the brake pedal pad and the accelerator pedal pad can be increased without using a rail structure in the present disclosure, there is an effect that a separate installation space of a rail is not desired, and particularly, it is possible to inhibit malfunction due to foreign substance stuck in a rail.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
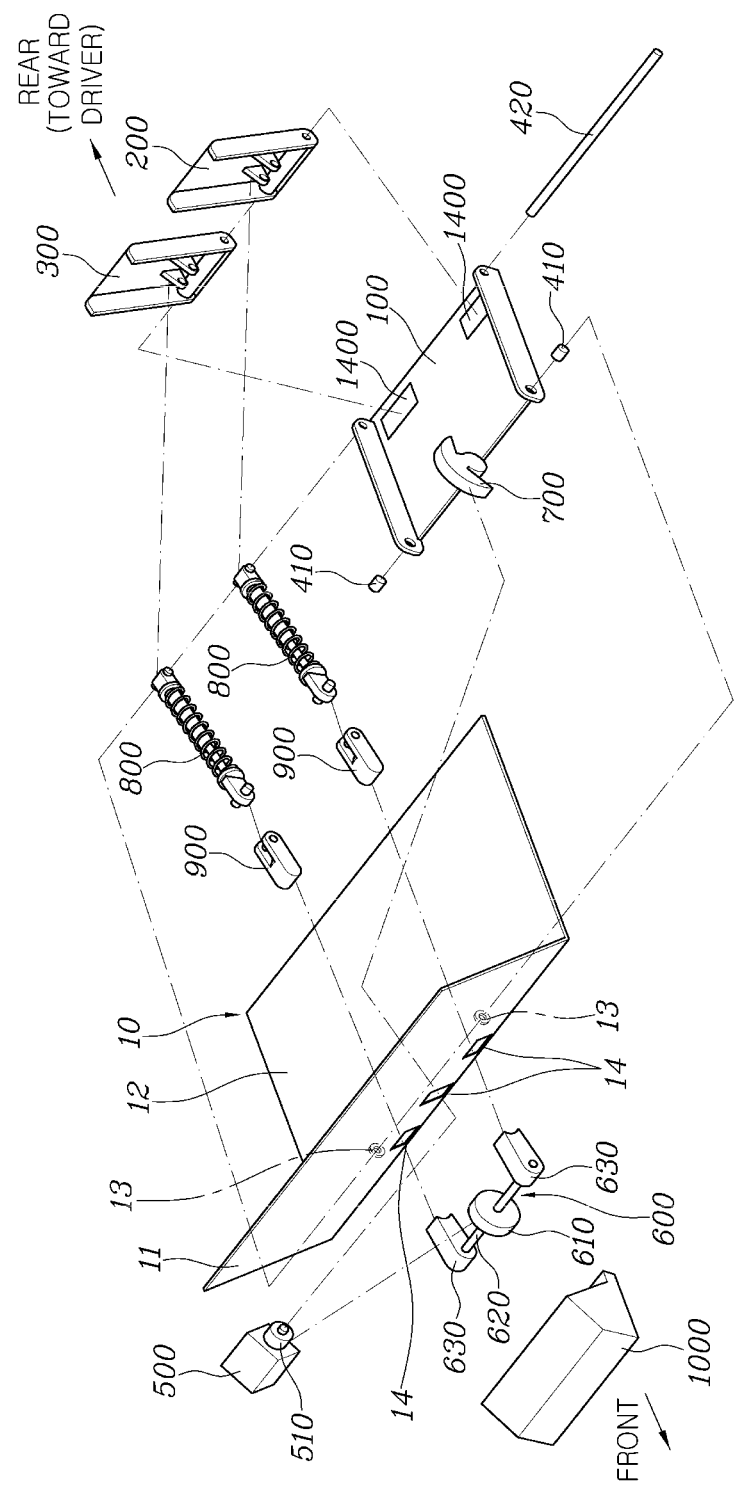
FIG. 1 is an exploded perspective view of foldable pedal apparatus for a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, the structural or functional description specified to exemplary forms according to the concept of the present disclosure is intended to describe the exemplary forms, so it should be understood that the present disclosure may be variously formed, without being limited to the exemplary forms.

Forms described herein may be changed in various ways and various shapes, so specific forms are shown in the drawings and will be described in detail in this specification. However, it should be understood that the exemplary forms according to the concept of the present disclosure are not limited to the forms which will be described hereinbelow with reference to the accompanying drawings, but all modifications, equivalents, and substitutions are included in the scope and spirit of the present disclosure.

It will be understood that, although the terms first, second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Terms used in the present disclosure are used only in order to describe specific exemplary forms rather than limiting the present disclosure. Singular forms are intended to include plural forms unless the context clearly indicates otherwise. It will be further understood that the terms "comprises" or "have" used in this specification specify the presence of stated features, numerals, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control unit (controller) according to exemplary forms of the present disclosure can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

A foldable pedal apparatus for a vehicle according an exemplary form of the present disclosure is described hereafter in detail with reference to the accompanying drawings.

A foldable pedal apparatus according to the present disclosure, as shown in FIGS. 1 to 14, includes: a pedal housing 100 rotatably coupled to a footrest panel 10 disposed below the driver seat, coming in contact with a front inclined surface 11 of the footrest panel 10 when rotating forward, and coming in contact with a bottom surface 12 of the footrest panel 10 when rotating rearward; and a brake pedal pad 200 and an accelerator pedal pad 300 rotatably coupled to the pedal housing 100 and being rotated by a driver.

The footrest panel 10 has the bottom surface 12 fixed in contact with the floor of a car body, and the front inclined surface 11 extending at an angle forward and upward from the front end of the bottom surface 11.

According to the foldable pedal apparatus of the present disclosure, when the pedal housing 100 is in contact with the front inclined surface 11 of the footrest panel 10 by rotating forward, the brake pedal pad 200 and the accelerator pedal pad 300 are folded to be positioned between the front inclined surface 11 and the pedal housing 100 and are kept in a hidden state in which they are not exposed to a driver (see FIGS. 2 to 6).

Further, according to the foldable pedal apparatus of the present disclosure, when the pedal housing 100 is in contact with the bottom surface 12 of the footrest panel 10 by rotating rearward, the brake pedal pad 200 and the accelerator pedal pad 300 are unfolded at a predetermined angle with respect to the pedal housing 100 and are kept in a pop-up state in which they are exposed to a driver (see FIGS. 7 to 10).

A first end of the pedal housing 100 is rotatably coupled to the footrest panel 10 by connection pins 410 at the joint between the bottom surface 12 and the front inclined surface 11 of the footrest panel 10.

Two hinge protrusions 13 are spaced apart from each other at the left and right at the joint between the bottom surface 12 and the front inclined surface 11 of the footrest panel 10. Referring to FIG. 1, the left and right sides of the front end of the pedal housing 100 are rotatably coupled to the hinge protrusions 13 of the footrest panel 10 by two connection pins 410.

Referring to FIG. 1, a hinge pin 420 is coupled to a second end facing the rear of the pedal housing 100 and is disposed through the brake pedal pad 200 and the accelerator pedal pad 200, whereby the brake pedal pad 200 and the accelerator pedal pad 200 are individually rotated on the hinge pin 420.

That is, the brake pedal pad 200 and the accelerator pedal pad 200 can be individually operated and rotated on the hinge pin 420 by a foot of a driver.

The foldable pedal apparatus according to the present disclosure includes: a rotary motor 500 fixed to the footrest panel 100 and including a motor gear 510; a rotary cam module 600 including a cam gear 610 engaged with the motor gear 510 like an external gear; a pedal housing gear 700 disposed at the pedal housing 100 and engaged with the motor gear 510 like an external gear; spring modules 800 including first ends rotatably coupled to the brake pedal pad 200 and the accelerator pedal pad 200, respectively; and straight motion blocks 900 including first ends rotatably coupled to second ends of the spring modules 800, respectively. The rotary cam module 600 and the straight motion block 800 are connected to each other by coming in contact with each other (FIGS. 7 to 10) or are disconnected from each other by separating from each other, depending on rotation of the rotary cam module 600 (FIGS. 2 to 6).

The foldable pedal apparatus according to the present disclosure further includes a protective cover 1000 fixed to the footrest panel 10 and covering and protecting the rotary motor 500 and the rotary cam module 600.

The protective cover 1000 is fixed to the front surface of the front inclined surface 11 of the footrest panel 10, and covers and protects all the components disposed ahead of the front inclined surface 11, including the rotary motor 500 and the rotary cam module 600.

The rotary motor 500 may be a step motor that is rotated in operation and is not rotated when stopping, and is electrically connected to a power device.

The rotary cam module 600 includes a cam gear 610 engaged with the motor gear 510 like an external gear, a cam shaft 620 integrally formed with the cam gear 610 through the center of the cam gear 610, and a pair of cam blocks 630 eccentrically coupled to both ends of the cam shaft 620, respectively.

Arc grooves 640 are formed at first ends of the cam block 630 and are the portions that come in contact with the straight motion blocks 900 when the rotary cam module 600 is rotated.

The pedal housing gear 700, referring FIG. 1, protrudes upward at the middle portion in the left-right direction at the front end of the pedal housing 100, and may be integrally formed with the pedal housing 100 or may be manufactured separately from the pedal housing 100 and then integrated by welding, etc.

The pedal housing gear 700 includes an arc external shape and is engaged with the motor gear 510 like an external gear.

The cam gear 610 is engaged like an external gear at the front and the pedal housing gear 700 is engaged like an external gear at the rear with the motor gear 510 therebetween.

The spring module 800 includes a cylinder 810, a rod 820, and a spring 830 having both ends supported by the cylinder 810 and the rod 820.

The rod 820 is inserted in the cylinder 810, so the length of the spring module 800 can be changed by the rod 820 moving through the cylinder 820. When the length is changed, the spring 830 is compressed or returned.

Referring to FIG. 1, the cylinders 810 are positioned at the rear and the rear ends of the cylinders 810 are rotatably coupled to the brake pedal pad 200 and the accelerator pedal pad 300. The rods 820 are positioned at the front and the front ends of the rods 820 are rotatably coupled to the rear ends of the straight motion blocks 900.

That is, two spring modules 800 having the same configuration are provided. One of the spring modules 800 rotatably connects the brake pedal pad 200 and one of the straight motion blocks 900 to each other. Further, the other one spring module 800 rotatably connects the accelerator pedal pad 300 and the other straight motion block 800 to each other.

Referring to FIG. 1, the straight motion block 900 includes a rear end rotatably coupled to the front end of the spring module 800 and a front end including an arc protrusion 910 having a shape corresponding to the arc groove 640 of the cam block 630. When the rotary cam module 600 is rotated, the arc protrusion 910 is inserted into the arc groove 640, whereby they come in contact with each other.

The foldable pedal apparatus according to the present disclosure further includes a guide panel 1100 fixed to the protective cover 1000, supporting upward the bottoms of the straight motion blocks 900, and guiding the straight motion blocks 900 straightly moving.

When the arc protrusion 910 is inserted into the arc groove 640 by rotation of the rotary cam module 600, the straight motion blocks 900 straightly move rearward against the elasticity of the springs 830. When the arc protrusion 910 comes out of the arc groove 640 by rotation of the rotary cam module 600, the straight motion blocks 900 are straightly moved forward by returning force of the springs 830. In this process, the guide panel 1100 coupled to the protective cover 1000 guides the straight motion blocks 900 straightly moving while supporting upward the bottoms of the straight motion blocks 900.

Three holes 14 are formed between the left and right hinge protrusions 13 of the footrest panel 10. The pedal housing gear 700 is disposed through the middle hole 14 and the straight motion blocks 900 are disposed through the holes 14 at both ends, respectively.

The pedal housing 100 is formed in a flat panel shape, includes left and right side covers, and is open in the up-down direction.

Figure 2:
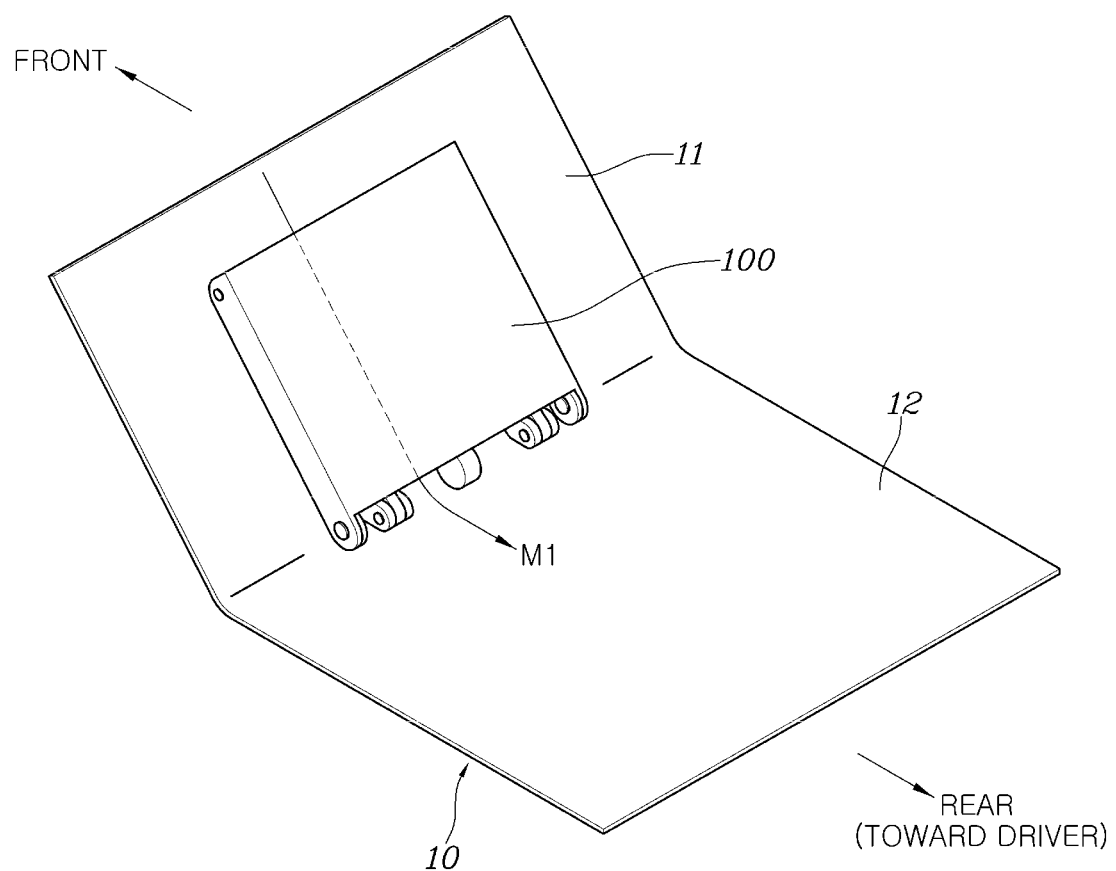
FIG. 2 is a perspective view showing the assembly of the apparatus shown in FIG. 1 with a brake pedal and an accelerator pedal hidden.
Figure 3:
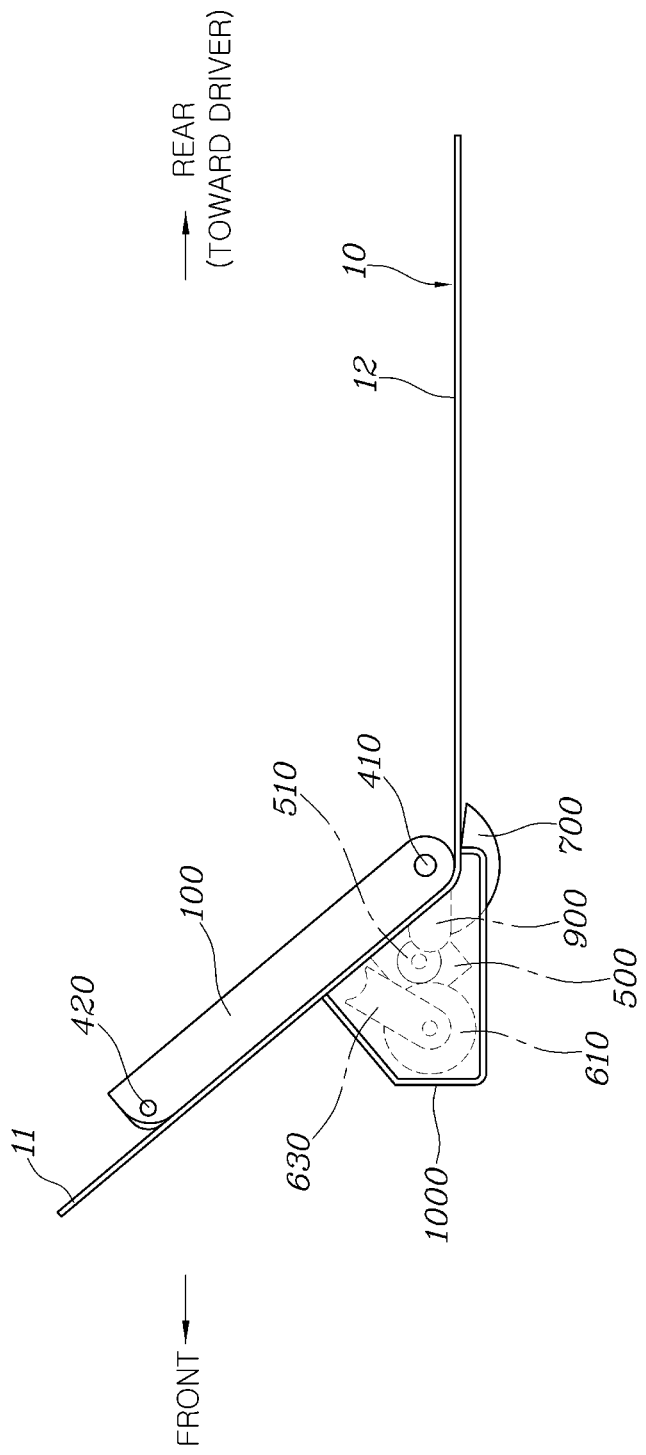
FIG. 3 is a side view of FIG. 2.
Figure 4:
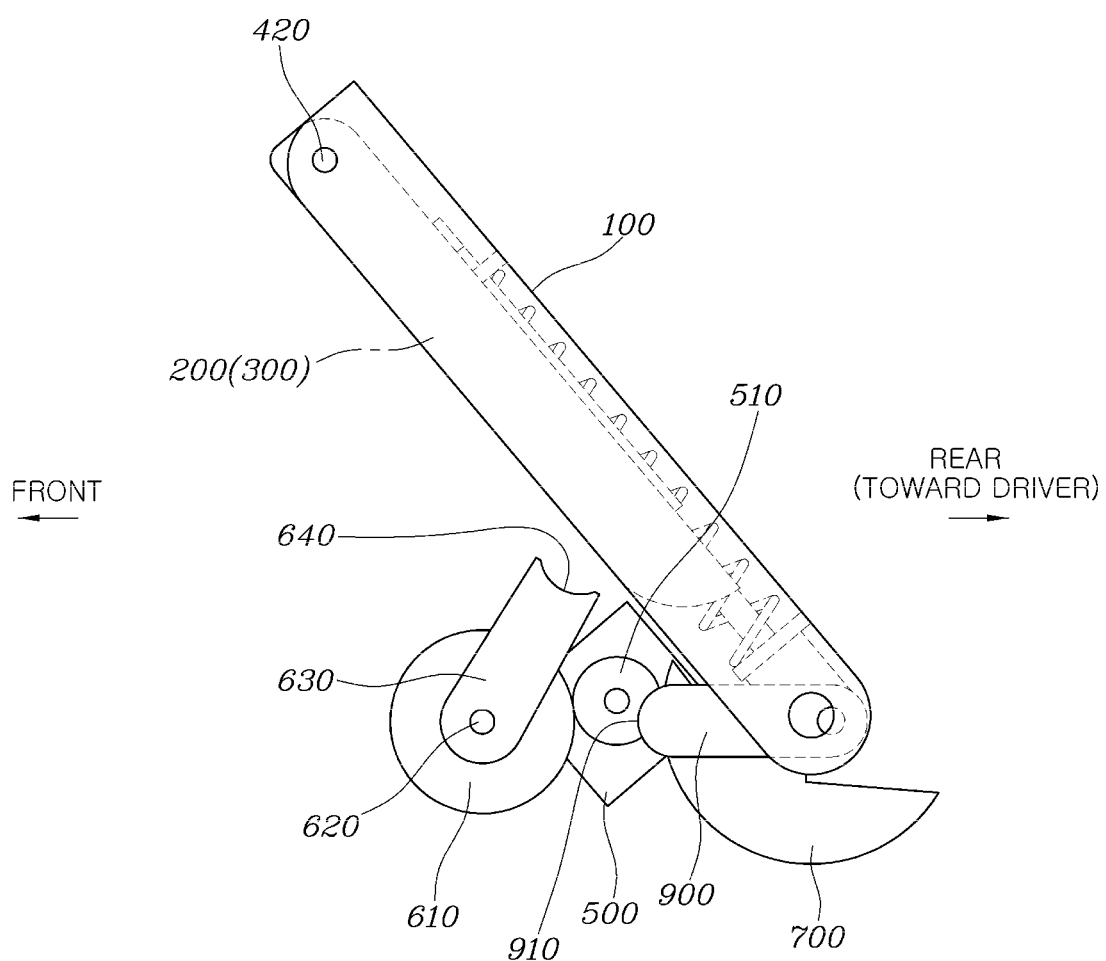
FIG. 4 is a view showing the state with a protective cover removed from FIG. 3.
Figure 5:
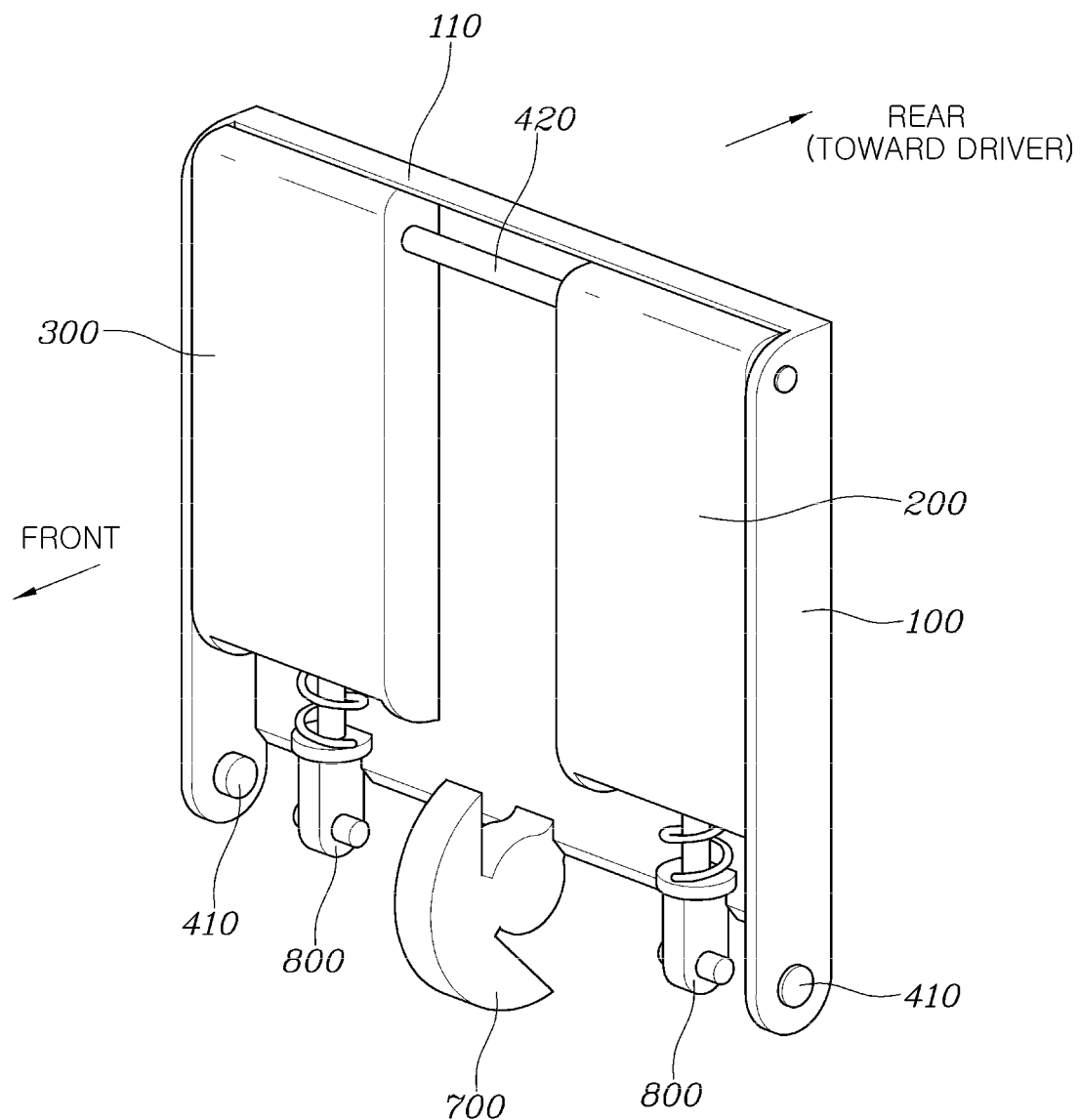
FIG. 5 is a view showing the inside of a pedal housing shown in FIG. 2.
Figure 6:
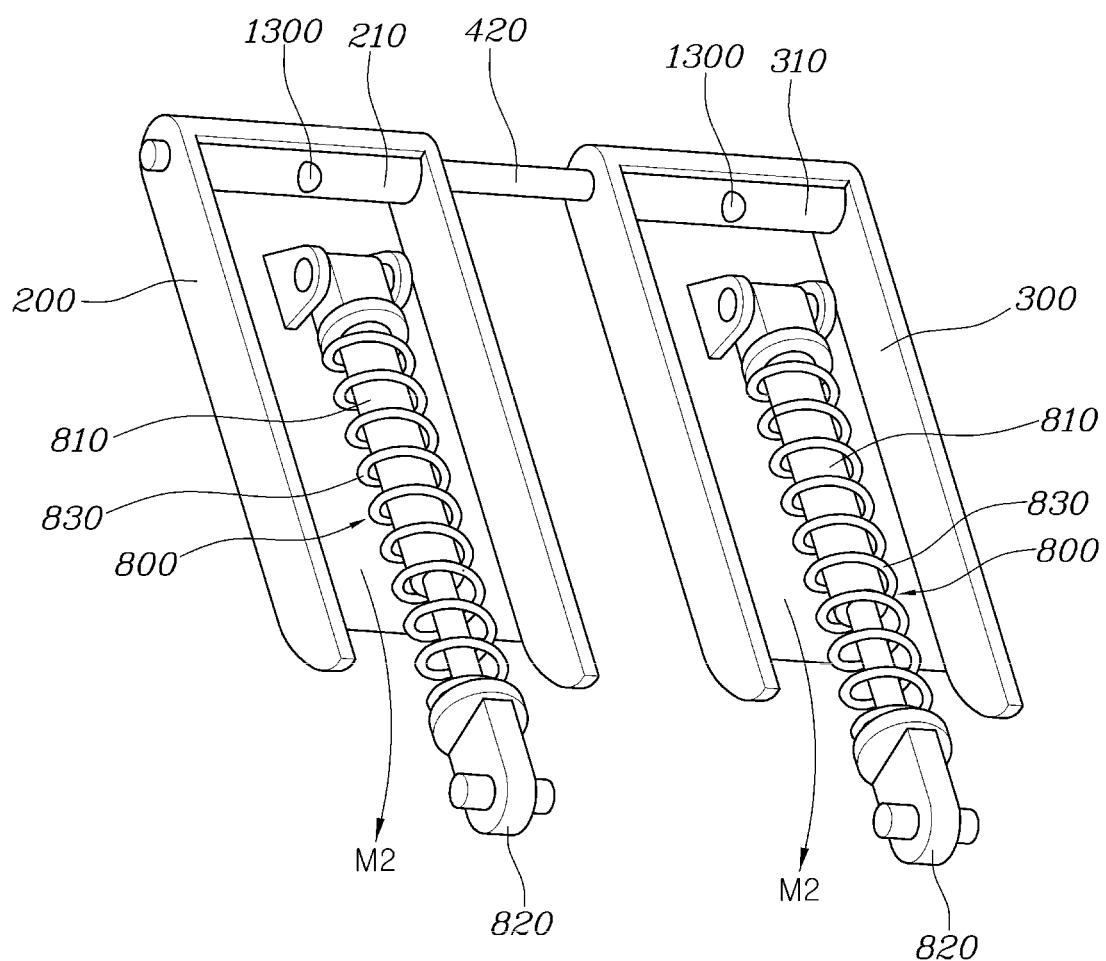
FIG. 6 is a view showing the inside of the brake pedal and the accelerator pedal shown in FIG. 5.
Figure 7:
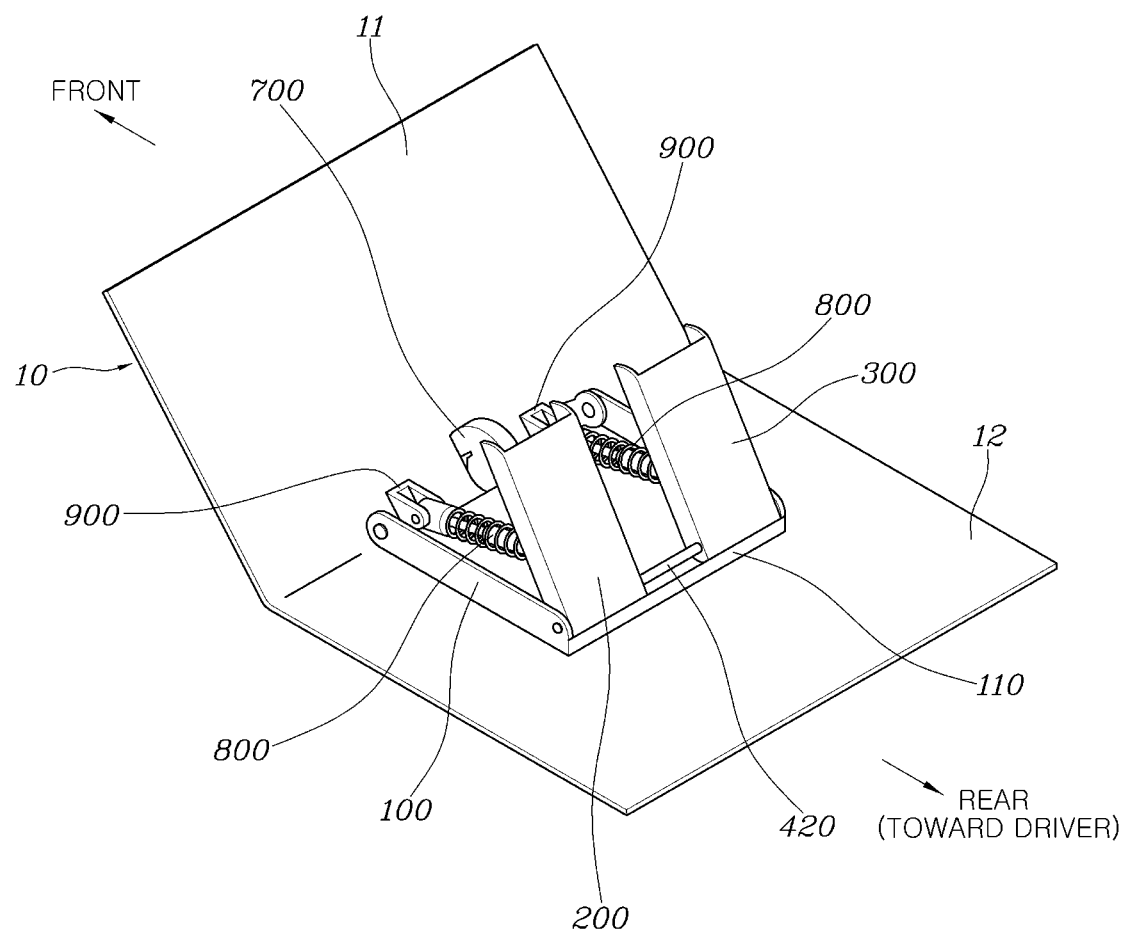
FIG. 7 is a view showing the state with the brake pedal and the accelerator pedal popped up according to one form of the present disclosure.
Figure 8:
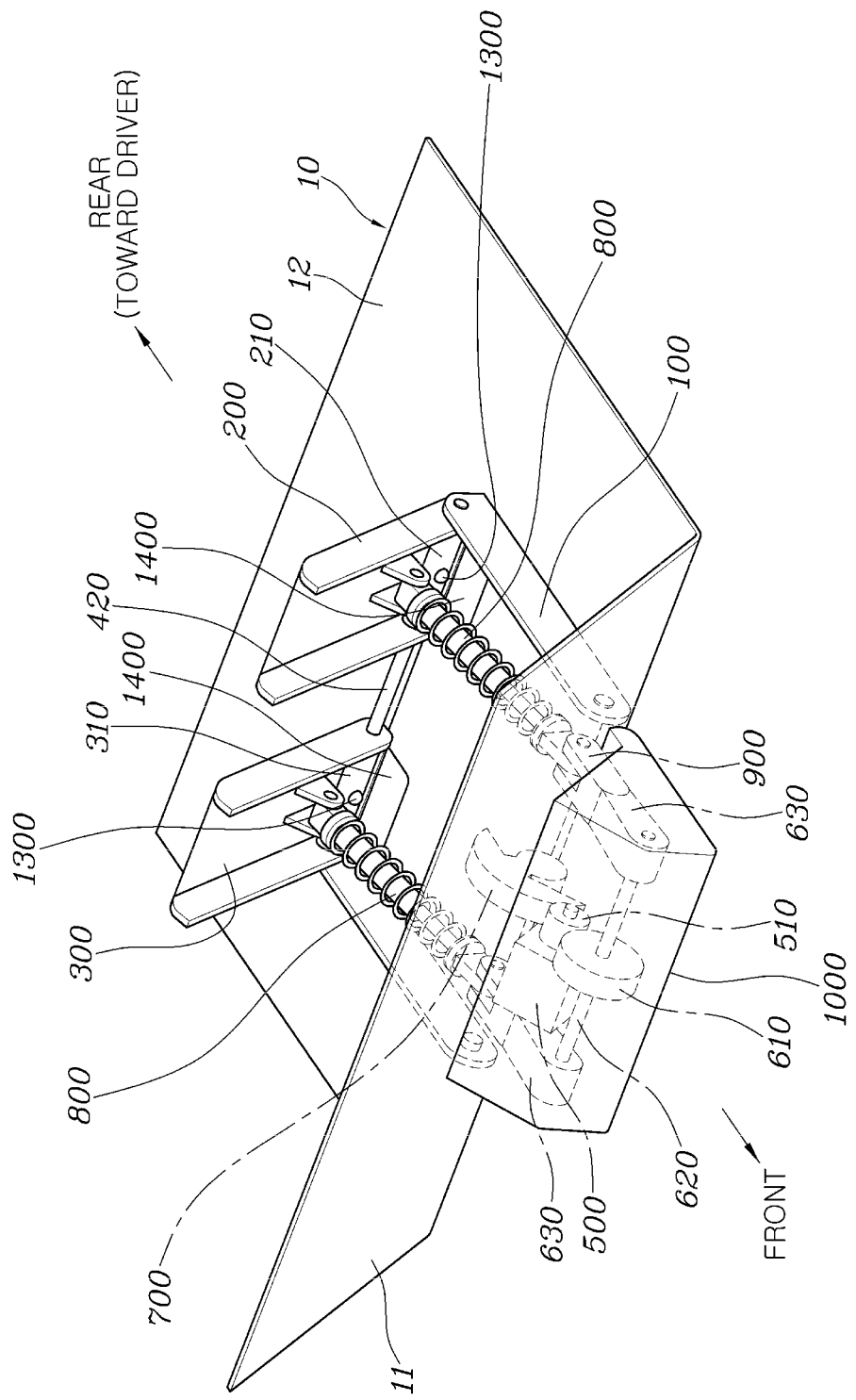
FIG. 8 is a view of FIG. 7 seen from the front.
Figure 9:
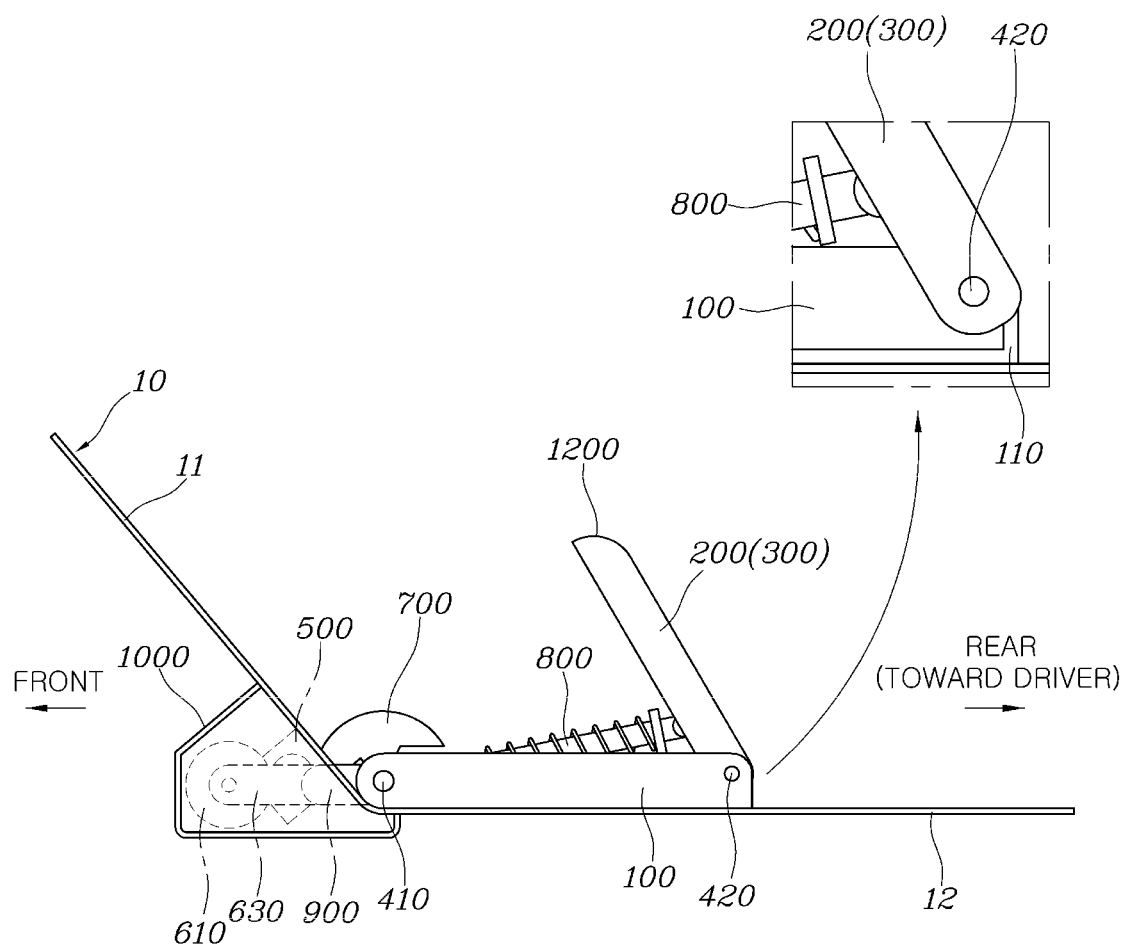
FIG. 9 is a side view of FIG. 7.
Figure 10:
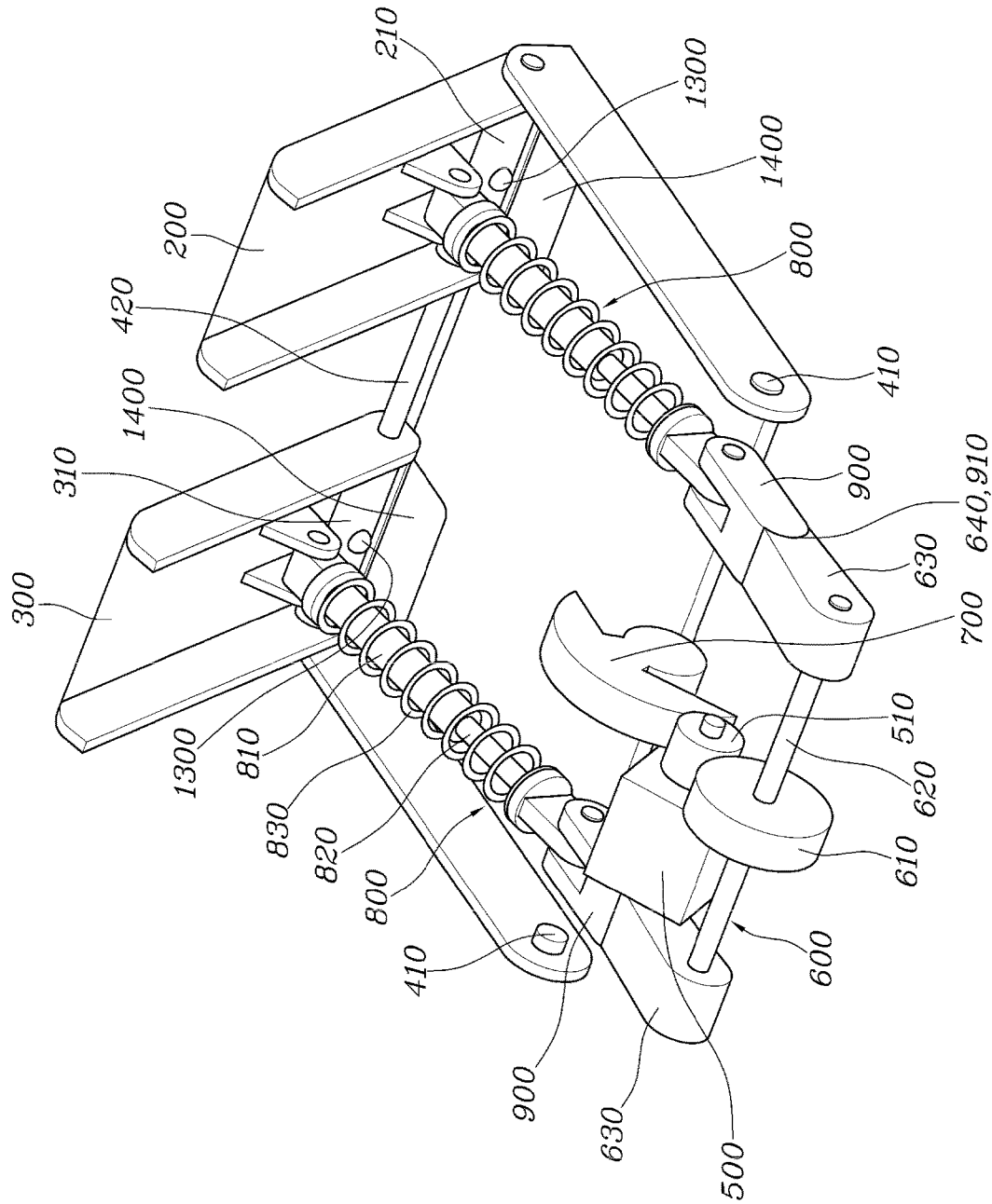
FIG. 10 is a view showing the state with a footrest panel and the protective cover removed from FIG. 8.
Figure 11:
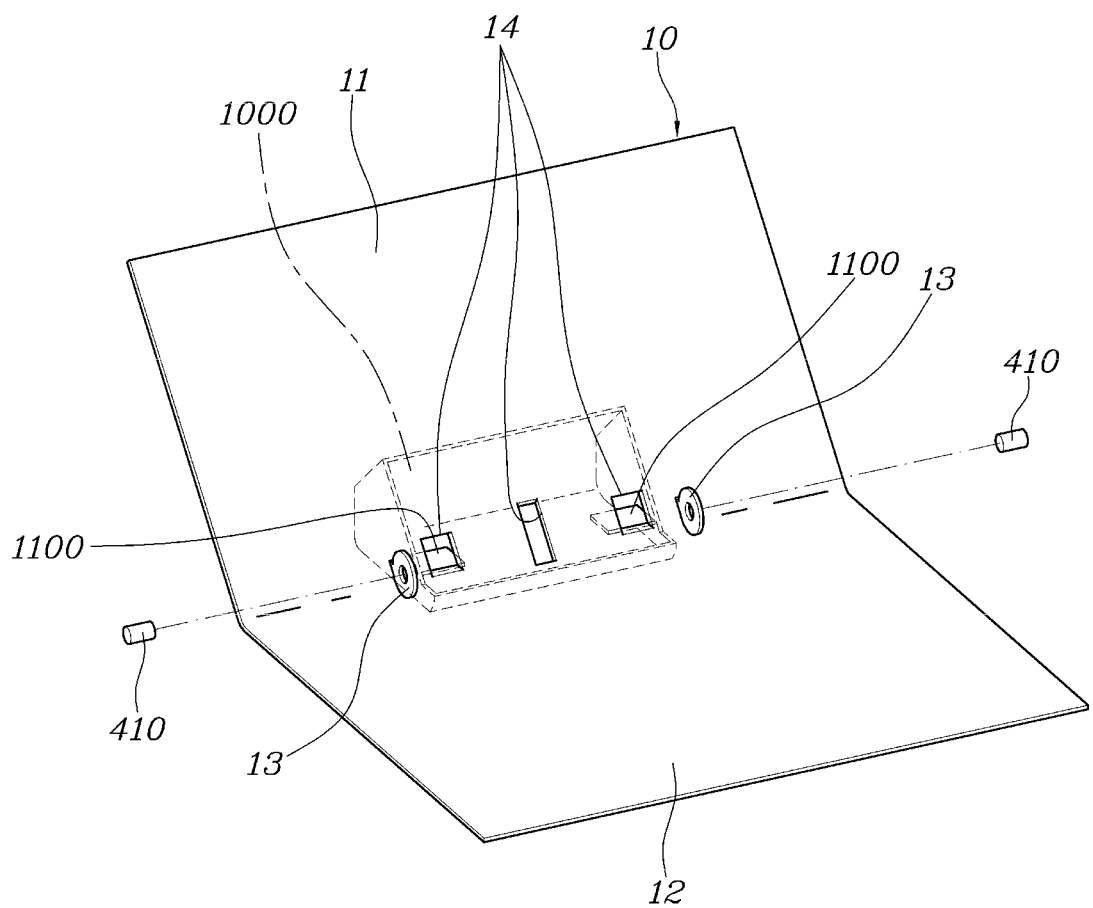
FIG. 11 is a perspective view showing the footrest panel combined with the protective cover according to one form of the present disclosure.
Figure 12:
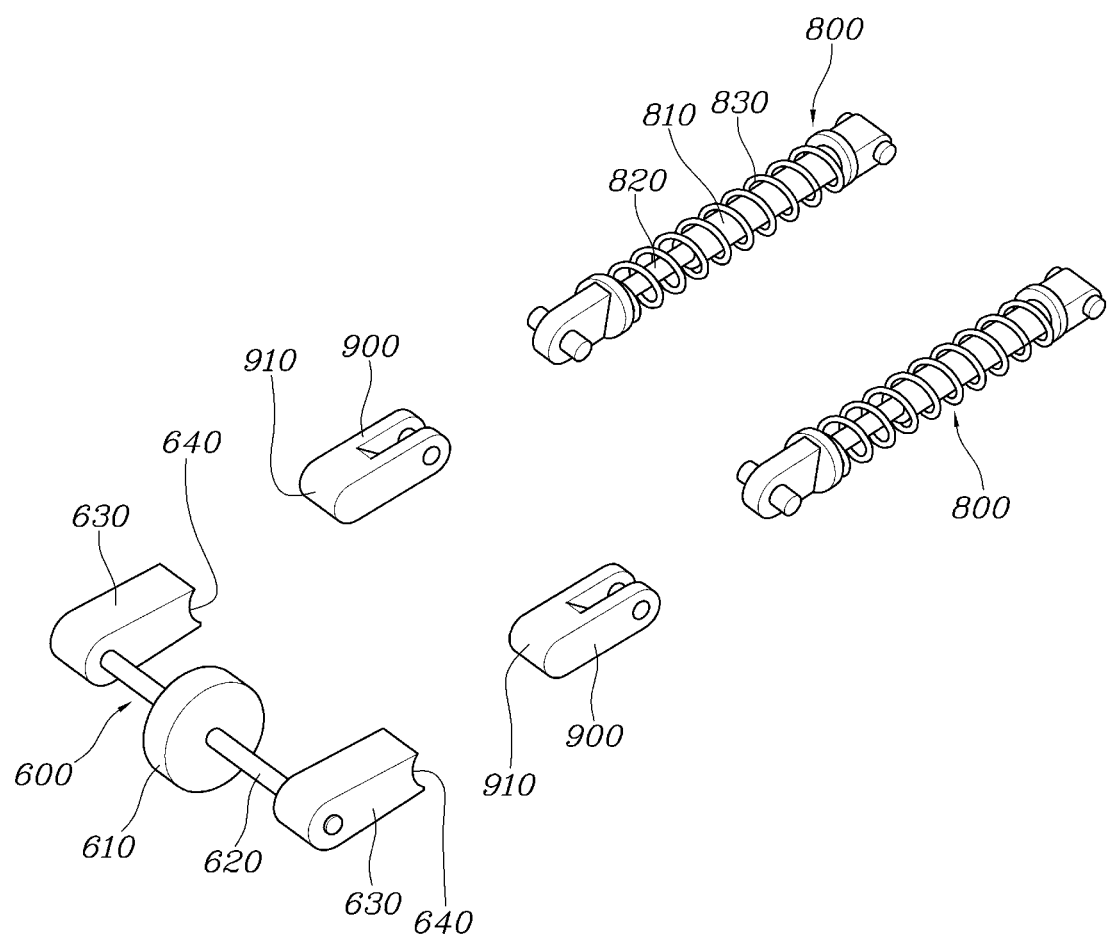
FIG. 12 is an exploded perspective view of a rotary cam module, a spring module, and a straight motion block according to one form of the present disclosure.
Figure 13:
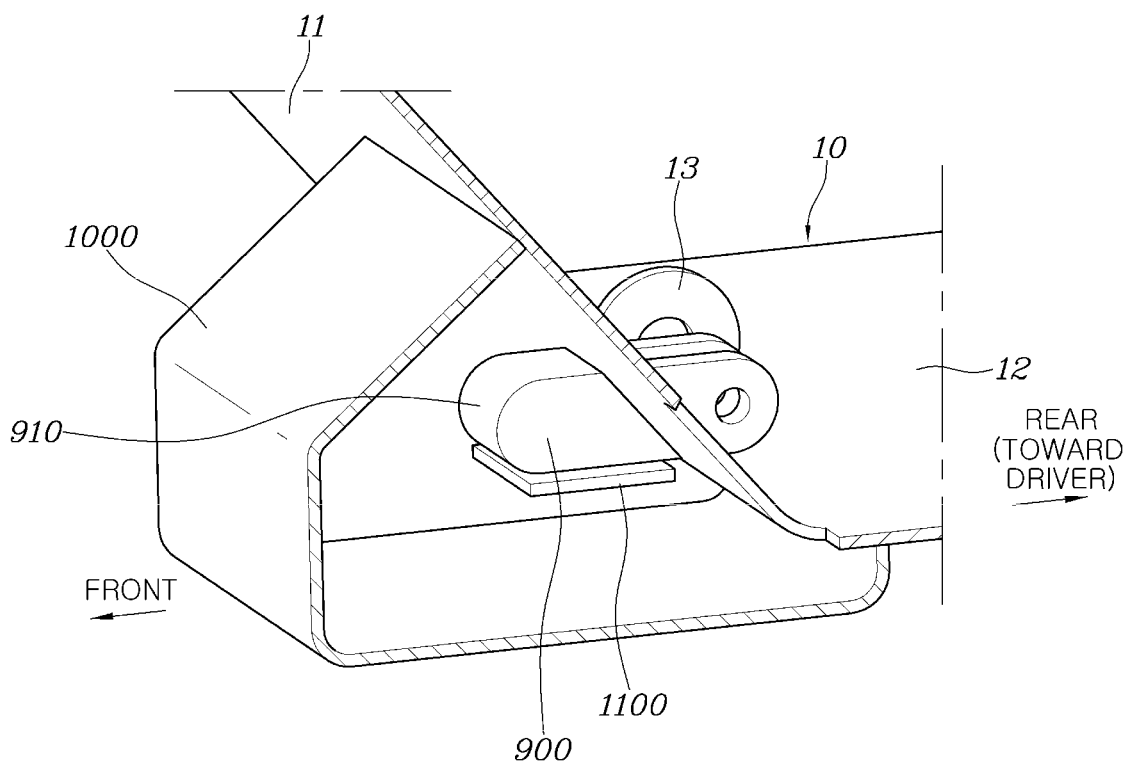
FIG. 13 is a view showing the straight motion block and a guide panel according to one form of the present disclosure.

Accordingly, as shown in FIGS. 2 to 6, when the pedal housing 100 is in contact with the front inclined surface 11 of the footrest panel 10 by rotating forward, the pedal housing 100 is open up and down with respect to the footrest panel 10, so foreign substance entering the pedal housing 100 can be discharged through the upper and lower openings (indicated by an arrow M1 in FIG. 2).

Further, when the pedal housing 100 is in contact with the front inclined surface 11 of the footrest panel 10 by rotating forward, and the brake pedal pad 200 and the accelerator pedal pad 300 have been folded to be positioned between the front inclined surface 11 and the pedal housing 100 and not to be exposed to a driver in a hidden state, the brake pedal pad 200 and the accelerator pedal pad 300 are open downward with respect to the pedal housing 100. Accordingly, foreign substances entering the brake pedal pad 200 and the accelerator pedal pad 300 can be discharged through the lower openings (indicated by an arrow M2 in FIG. 6).

The lower openings of the brake pedal pad 200 and the accelerator pedal pad 300 also inhibit interference with the spring modules 800 in the hidden state.

Figure 14:
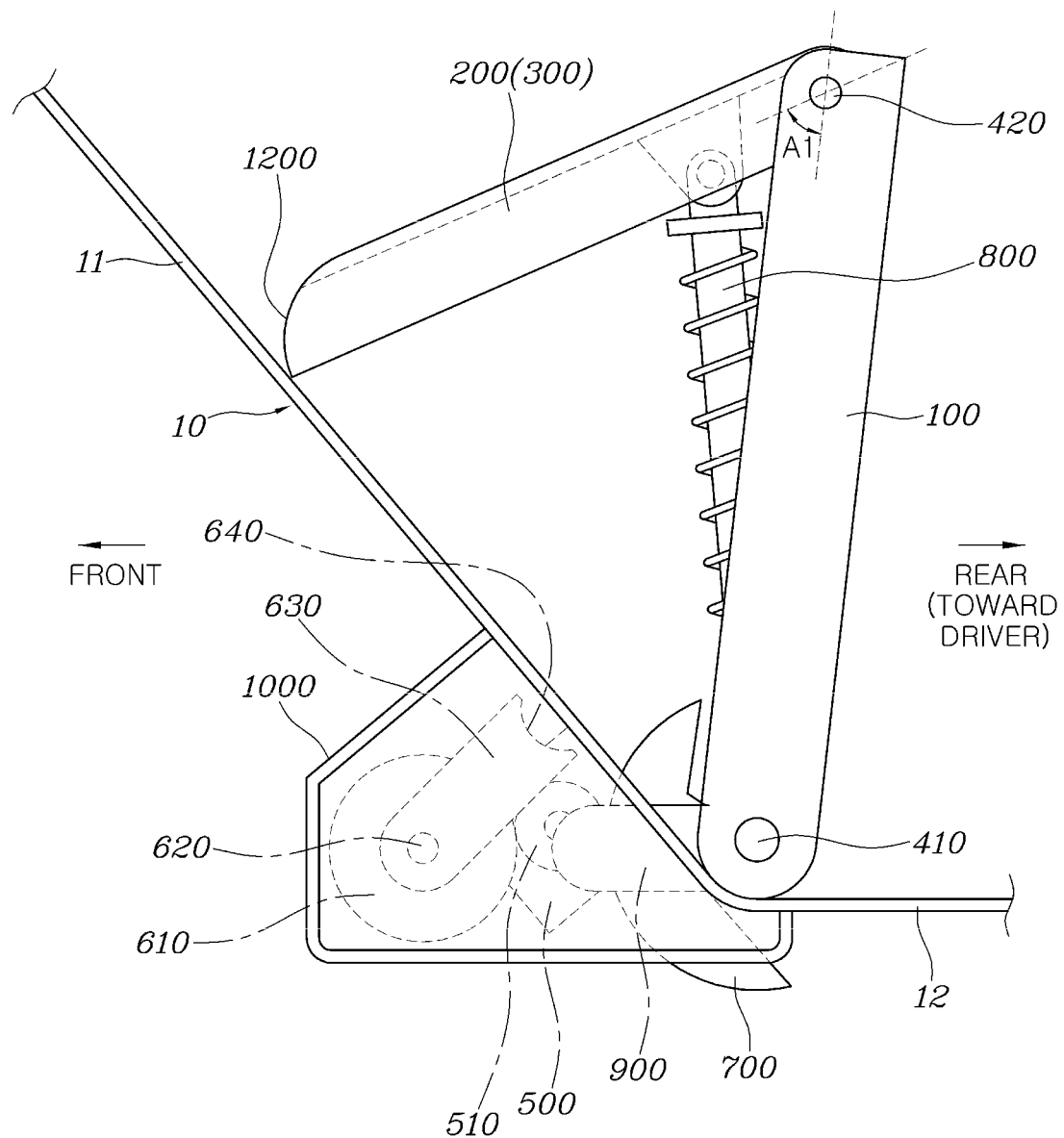
FIG. 14 is a view showing the state with the top of the brake pedal and the top of the accelerator pedal in contact with the front inclined surface of the footrest panel when a pop-up state changes into a hidden state according to one form of the present disclosure.

When the pedal housing 100 being in contact with the bottom surface 12 of the footrest panel 10 is rotated forward, that is, the pedal housing 100 is rotated forward from the pop-up state into the hidden state, the top of the brake pedal pad 200 and the top of the accelerator pedal pad 300 come in contact with the front inclined surface 11 of the footrest panel 10 (see FIG. 14).

When the top of the brake pedal pad 200 and the top of the accelerator pedal pad 300 come in contact with the front inclined surface 11 of the footrest panel 10, the angle between the pedal housing 100 and the brake pedal pad 200 and the angle between the pedal housing 100 and the accelerator pedal pad 300 are the same acute angles (A1 in FIG. 14). Accordingly, the brake pedal pad 200 and the accelerator pedal pad 300 can be more easily folded into the pedal housing 100 when the pop-up state is changed into the hidden state.

When the brake pedal pad 200 and the accelerator pedal pad 300 change into the hidden state from the pop-up state, as shown in FIG. 14, and the top of the brake pedal pad 200 and the top of the accelerator pedal pad 300 come in contact with the front inclined surface 11 of the footrest panel 10, the brake pedal pad 200 and the accelerator pedal pad 300 should be smoothly folded into the pedal housing 100. Therefore, according to the present disclosure, the top of the brake pedal pad 200 and the top of the accelerator pedal pad 300 are both rounded 1200 so that the brake pedal pad 200 and the accelerator pedal pad 300 can be smoothly folded.

According to the foldable pedal apparatus of the present disclosure, when the pedal housing 100 is in contact with the bottom surface 12 of the footrest panel 10 by rotating rearward and the brake pedal pad 200 and the accelerator pedal pad 300 have been folded in the pop-up state to be exposed to a driver, the lower end of the brake pedal pad 200 and the lower end of the accelerator pedal pad 300 are both in contact with the protrusion 110 protruding upward at the rear end of the pedal housing 100. Accordingly, the brake pedal pad 200 and the accelerator pedal pad 300 are fixed at the initial positions in the pop-up state by the protrusion 110 (see FIG. 9).

The foldable pedal apparatus of the present disclosure further includes permanent magnets 1300 coupled to the hinge portion 210 of the brake pedal pad 200 and the hinge portion 310 of the accelerator pedal pad 300, respectively, and Printed Circuit Boards 1400 (PCB) fixed to the pedal housing 100 to face the permanent magnets 1300.

The PCBs 1400 control the operation of the rotary motor 500.

The PCBs 1400 also detects rotation of the brake pedal pad 200 and the accelerator pedal pad 300 when the brake pedal pad 200 and the accelerator pedal pad 300 are pressed down by a driver.

That is, the PCBs 1400 detect the rotation angle of the brake pedal pad 200 or the accelerator pedal pad 300 and generate a signal related to the pedal function on the basis of a magnetic flux change of the permanent magnets 1300 when the brake pedal pad 200 or the accelerator pedal pad 300 is rotated. The PCBs 1400 generate a signal related to braking when the brake pedal pad 200 is operated and generate a signal related to acceleration when the accelerator pedal pad 300 is operated.

FIGS. 2 to 6 show the hidden state in which the brake pedal pad 200 and the accelerator pedal pad 300 have been folded to be positioned between the front inclined surface 11 of the footrest panel 10 and the pedal housing 100 not to be exposed to a driver.

In the hidden state, the arc protrusions 910 of the straight motion blocks 900 have come out of the arc grooves 640 of the cam blocks 630 by rotation of the cam block 630 due to operation of the rotary motor 500. Accordingly, the cam block 630 and the straight motion blocks 900 have been disconnected. Further, the pedal housing 100 is in contact with the front inclined surface 11 of the footrest panel 10 by rotating forward on the connection pins 410 by the torque transmitted through the pedal housing gear 700 from the rotary motor 500. In this process, the brake pedal pad 200 and the accelerator pedal pad 300 are folded into the hidden state to be positioned between the front inclined surface 11 of the footrest panel 10 and the pedal housing 100 and not to be exposed to a driver.

As described above, when the brake pedal pad 200 and the accelerator pedal pad 300 enter the hidden state, a wide space without interference with the pedals is formed below the driver seat and the driver can comfortably take a rest in a relax mode. Further, mis-operation of the pedals is inhibited in a self-driving situation, whereby safety can be improved.

Further, since the brake pedal pad 200 and the accelerator pedal pad 300 are completely covered and hidden by the pedal housing 100 in the hidden state, an excellent design can be provided. In particular, even if a driver hits the pedal housing 100 by stretching a foot by mistake, damage to the brake pedal pad 200 and the accelerator pedal pad 300 can be inhibited.

FIGS. 7 to 10 shows the pop-up state in which the pedal housing 100 is in contact with the bottom surface 12 of the footrest panel 10 and the brake pedal pad 200 and the accelerator pedal pad 300 have been unfolded from the pedal housing 100 to be exposed to a driver.

In the hidden state described above, the arc protrusions of the straight motion blocks 900 are inserted in the arc grooves 640 of the cam blocks 630 by rotation of the cam block 630 due to operation of the rotary motor 500. Accordingly, the cam block 630 and the straight motion blocks 900 have been connected in contact with each other. Further, the pedal housing 100 is in contact with the bottom surface 12 of the footrest panel 10 by rotating rearward on the connection pins 410 by the torque transmitted through the pedal housing gear 700 from the rotary motor 500. In this process, the brake pedal pad 200 and the accelerator pedal pad 300 are unfolded at a predetermined angle from the pedal housing 100 by elasticity of the spring modules 800 to enter the pop-up state to be exposed to a driver.

When the foldable pedal apparatus according to the present disclosure changes into the pop-up state from the hidden state, the popup amount of the brake pedal pad 200 and the accelerator pedal pad 300 can be increased by the distance that the pedal housing 100 rotates rearward on the connection pins 410. Accordingly, a driver can more easily and conveniently operate the brake pedal pad 200 and the accelerator pedal pad 300 when a self-driving mode has been changed into a manual driving mode.

Further, since the popup amount of the brake pedal pad 200 and the accelerator pedal pad 300 can be increased without using a rail structure in the present disclosure, a separate installation space of a rail is not desired, and particularly, it is possible to inhibit malfunction due to foreign substances stuck in the rail.

As described above, when the brake pedal pad 200 and the accelerator pedal pad 300 protrude from the pedal housing 100 in the pop-up state, a driver normally operate the brake pedal pad 200 and the accelerator pedal pad 300 by pressing down them.

When the brake pedal pad 200 and the accelerator pedal pad 300 are normally operated, the pressing effort can be implemented through a change of length of the spring modules 800.

When the brake pedal pad 200 or the accelerator pedal pad 300 is rotated by a driver, the PCBs 1400 detect the rotation angle of the brake pedal pad 200 or the accelerator pedal pad 300 and generate a signal related to the pedal function (a signal related to acceleration or a signal related to braking) on the basis of a magnetic flux change of the permanent magnet 1300 operating together with the brake pedal pad 200 or the accelerator pedal pad 300.

One form of the present disclosure is characterized in that when the pedal housing 100 is rotated by operation of the rotary motor 500 and the positions of the permanent magnets 1300 are changed while the brake pedal pad 200 and the accelerator pedal pad 300 are rotated into the hidden state or the pop-up state, the PCBs 1400 do not generate a signal related to the pedal function (a signal related to acceleration or a signal related to braking) to inhibit mis-operation.

That is, the brake pedal pad 200 and the accelerator pedal pad 300 enter the hidden state, as shown in FIGS. 2 to 6, or enter the pop-up state, as shown in FIGS. 7 to 10, by operation of the rotary motor 500, the PCBs 1400 do not generate a signal related to the pedal function even though the positions of the permanent magnets 1300 are changed, whereby an accident due to mis-operation is inhibited.

However, only when the brake pedal pad 200 and the accelerator pedal pad 300 are rotated by a driver and the permanent magnets 1300 are rotated together with the brake pedal pad 200 and the accelerator pedal pad 300 such that the positions of the permanent magnets 1300 are changed, with the brake pedal pad 200 and the accelerator pedal pad 300 in the pop-up state and the rotary motor 500 not in operation, the PCBs 1400 generate a signal related to the pedal function, whereby more stable operation can be implemented.

As described above, according to the foldable pedal apparatus of the present disclosure, the brake pedal pad 200 and the accelerator pedal pad 300 protrude from the pedal housing 100 to enter the pop-up state to be exposed to a driver such that the brake pedal pad 200 and the accelerator pedal pad 300 can be operated by the driver in the manual driving mode in which the driver manually drives. Further, the brake pedal pad 200 and the accelerator pedal pad 300 are inserted into the pedal housing 100 to enter the hidden state not to be exposed to the driver in the self-driving mode in which the driver does not manually drive. Accordingly, there is an advantage that the driver can comfortably take a rest in the self-driving situation and safety can be improved by inhibiting mis-operation of the pedals in the self-driving situation.

Further, according to the foldable pedal apparatus of the present disclosure, since the brake pedal pad 200 and the accelerator pedal pad 300 are completely covered and hidden by the pedal housing 100 in the hidden state, there is an advantage that an excellent design can be provided, and particularly, even if a driver hits the pedal housing 100 by stretching a foot by mistake, damage to the brake pedal pad 200 and the accelerator pedal pad 300 can be inhibited.

Further, when the foldable pedal apparatus according to the present disclosure changes into the pop-up state from the hidden state, the popup amount of the brake pedal pad 200 and the accelerator pedal pad 300 can be increased by the distance that the pedal housing 100 rotates rearward on the connection pins 410. Accordingly, there is an advantage that a driver can more easily and conveniently operate the brake pedal pad 200 and the accelerator pedal pad 300 when a self-driving mode has been changed into a manual driving mode.

Further, according to the foldable pedal apparatus of the present disclosure, since the popup amount of the brake pedal pad 200 and the accelerator pedal pad 300 can be increased without using a rail structure in the present disclosure, there is an advantage that it a separate installation space of a rail is not desired, and particularly, it is possible to inhibit malfunction due to foreign substance stuck in a rail.

Although the present disclosure was described with reference to specific forms shown in the drawings, it is apparent to those skilled in the art that the present disclosure may be changed and modified in various ways without departing from the scope of the present disclosure.

What is claimed is:
1. A foldable pedal apparatus for a vehicle, the foldable pedal apparatus comprising:
 a pedal housing rotatably coupled to a footrest panel disposed below a driver seat, and configured to:
  come in contact with a front inclined surface of the footrest panel when rotating forward, and
  come in contact with a bottom surface of the footrest panel when rotating rearward;
 a brake pedal pad rotatably coupled to the pedal housing and configured to be rotated by a driver; and
 an accelerator pedal pad rotatably coupled to the pedal housing and configured to be rotated by the driver,
 wherein when the pedal housing is in contact with the front inclined surface of the footrest panel by rotating forward, the brake pedal pad and the accelerator pedal pad are folded to be positioned between the front inclined surface and the pedal housing and are kept in a hidden state.

2. The foldable pedal apparatus of claim 1, wherein when the pedal housing is in contact with the bottom surface of the footrest panel by rotating rearward, the brake pedal pad and the accelerator pedal pad are unfolded at a predetermined angle with respect to the pedal housing and are kept in a pop-up state.

3. The foldable pedal apparatus of claim 1, wherein a first end of the pedal housing is rotatably coupled to the footrest panel by a connection pin at a joint between the bottom surface and the front inclined surface of the footrest panel.

4. The foldable pedal apparatus of claim 3, further comprising a hinge pin coupled to a second end of the pedal housing and disposed through the brake pedal pad and the accelerator pedal pad,
wherein the brake pedal pad and the accelerator pedal pad are configured to be individually rotated on the hinge pin.

5. The foldable pedal apparatus of claim 1, further comprising:
a rotary motor fixed to the footrest panel and including a motor gear;
a rotary cam module including a cam gear engaged with the motor gear;
a pedal housing gear disposed at the pedal housing and engaged with the motor gear;
a first spring module including a first end rotatably coupled to the brake pedal pad;
a second spring module including a first end coupled to the accelerator pedal pad;
a first straight motion block including a first end rotatably coupled to a second end of the first spring module; and
a second straight motion block including a first end rotatably coupled to a second end of the second spring module,
wherein the rotary cam module and the first and second straight motion blocks are configured to be connected to each other by coming in contact with each other or to be disconnected from each other by being separated from each other, depending on rotation of the rotary cam module.

6. The foldable pedal apparatus of claim 5, further comprising a protective cover fixed to the footrest panel, and configured to cover and protect the rotary motor and the rotary cam module.

7. The foldable pedal apparatus of claim 6, further comprising a guide pale coupled to the protective cover, and configured to support and guide the first and second straight motion blocks to move straightly.

8. The foldable pedal apparatus of claim 5, wherein the rotary cam module includes:
a cam shaft integrally formed with a cam gear through a center of the cam gear;
a first cam block eccentrically coupled to a first end of the cam shaft and including an arc groove formed at a first end of the first cam block; and
a second cam block eccentrically coupled to a second end of the cam shaft and including an arc groove formed at a first end of the second cam block,
wherein the arc grooves of the first and second cam blocks come in contact with the first and second straight motion blocks, respectively, when the rotary cam module is rotated.

9. The foldable pedal apparatus of claim 8, wherein:
the first and second straight motion blocks each include an arc protrusion formed at second ends of the first and second straight motion blocks, and
the arc protrusions of the first and second straight motion blocks have a shape corresponding to the arc grooves of the first and second cam blocks, respectively, and the arc grooves and the arc protrusions come in contact with each other by rotation of the rotary cam module.

10. The foldable pedal apparatus of claim 5, wherein:
the first and second spring modules each include a cylinder, a rod, and a spring,
first and second ends of the spring is supported by the cylinder and the rod,
lengths of the first and second spring modules are changed by the rods moving through the cylinders, and
the first and second spring modules have the same configuration and are connected to the brake pedal pad and the accelerator pedal pad, respectively.

11. The foldable pedal apparatus of claim 5, further comprising:
a first permanent magnet coupled to a hinge portion of the brake pedal pad;
a second permanent magnet coupled to a hinge portion of the accelerator pedal pad; and
PCBs fixed to the pedal housing and facing the first and second permanent magnets,
wherein the PCBs are configured to detect a rotation angle of the brake pedal pad or the accelerator pedal pad and generate a signal related to a pedal function based on a magnetic flux change of the first and second permanent magnet when the brake pedal pad or the accelerator pedal pad is rotated.

12. The foldable pedal apparatus of claim 11, wherein when the pedal housing is rotated by operation of the rotary motor and positions of the first and second permanent magnets are changed while the brake pedal pad and the accelerator pedal pad are rotated into the hidden state or a pop-up state, the PCBs do not generate the signal related to the pedal function.

13. The foldable pedal apparatus of claim 11, wherein the PCBs generate the signal related to the pedal function only when:
the brake pedal pad and the accelerator pedal pad in a pop-up state, the rotary motor is not in operation, and positions of the first and second permanent magnets are changed due to rotation of the brake pedal pad or the accelerator pedal pad by the driver.

14. The foldable pedal apparatus of claim 1, wherein when the pedal housing is in contact with the front inclined surface of the footrest panel by rotating forward, the pedal housing includes an upper opening that is open up and a lower opening that is open down with respect to the footrest panel.

15. The foldable pedal apparatus of claim 1, wherein:
when the pedal housing is in contact with the front inclined surface of the footrest panel by rotating forward, the brake pedal pad and the accelerator pedal pad have been folded to be positioned between the front inclined surface and the pedal housing, and the brake pedal pad and the accelerator pedal pad are not exposed to the driver in the hidden state, and
the brake pedal pad and the accelerator pedal pad each includes a lower opening that is open downward with respect to the pedal housing and that is configured to discharge foreign substances.

16. The foldable pedal apparatus of claim 1, wherein:

when the pedal housing being in contact with the bottom surface of the footrest panel is rotated forward, a top of the brake pedal pad and a top of the accelerator pedal pad come in contact with the front inclined surface of the footrest panel; and when the top of the brake pedal pad and the top of the accelerator pedal pad come in contact with the front inclined surface of the footrest panel, an angle between the pedal housing and the brake pedal pad and an angle between the pedal housing and an accelerator pedal are same acute angles.

17. The foldable pedal apparatus of claim 1, wherein:

when the pedal housing being in contact with the bottom surface of the footrest panel is rotated forward, a top of the brake pedal pad and a top of the accelerator pedal pad come in contact with the front inclined surface of the footrest panel; and the top of the brake pedal pad and the top of the accelerator pedal pad are both rounded and are configured to be folded into the pedal housing when the top of the brake pedal pad and the top of the accelerator pedal pad come in contact with the front inclined surface of the footrest panel.

18. The foldable pedal apparatus of claim 1, wherein:

when the pedal housing is in contact with the bottom surface of the footrest panel by rotating rearward and the brake pedal pad and the accelerator pedal pad have been folded in a pop-up state, a lower end of the brake pedal pad and a lower end of the accelerator pedal pad both come in contact with a protrusion protruding upward at a rear end of the pedal housing, and initial positions in the pop-up state are fixed.

* * * * *